(12) United States Patent
Lee et al.

(10) Patent No.: US 10,882,989 B2
(45) Date of Patent: Jan. 5, 2021

(54) RESIN BLEND

(71) Applicant: LG CHEM, LTD., Seoul (KR)

(72) Inventors: Jong Won Lee, Daejeon (KR); Han Na Lee, Daejeon (KR); Jin Young Ryu, Daejeon (KR); Woo Sung Kim, Daejeon (KR); Eun Joo Choi, Daejeon (KR); Hyeon Choi, Daejeon (KR)

(73) Assignee: LG CHEM. LTD., Seoul (KR)

( * ) Notice: Subject to any disclaimer, the term of this patent is extended or adjusted under 35 U.S.C. 154(b) by 0 days.

(21) Appl. No.: 14/904,930

(22) PCT Filed: Jul. 15, 2014

(86) PCT No.: PCT/KR2014/006361
§ 371 (c)(1),
(2) Date: Jan. 13, 2016

(87) PCT Pub. No.: WO2015/009014
PCT Pub. Date: Jan. 22, 2015

(65) Prior Publication Data
US 2016/0137829 A1    May 19, 2016

(30) Foreign Application Priority Data

Jul. 15, 2013 (KR) .................. 10-2013-0082947
Jul. 15, 2014 (KR) .................. 10-2014-0088874

(51) Int. Cl.
*C08L 33/12* (2006.01)
*B32B 27/08* (2006.01)
(Continued)

(52) U.S. Cl.
CPC .............. *C08L 33/12* (2013.01); *B32B 27/08* (2013.01); *B32B 27/308* (2013.01);
(Continued)

(58) Field of Classification Search
None
See application file for complete search history.

(56) References Cited

U.S. PATENT DOCUMENTS 3,957,921 A * 5/1976 Iwahashi ................. C08L 25/14
525/228
4,446,259 A * 5/1984 Vasta ................... C09D 125/14
523/408
(Continued)

FOREIGN PATENT DOCUMENTS

CN    101813801 A    8/2010
CN    102272640 A    12/2011
(Continued)

*Primary Examiner* — Ronak C Patel
(74) *Attorney, Agent, or Firm* — Dentons US LLP

(57) ABSTRACT

Provided are a resin blend, a copolymer, a pellet, a method of manufacturing a resin molded article using the same, and a resin molded article. The exemplary resin blend may provide a protective film for a polarizing plate having an excellent adhesive strength to a polarizer. In addition, when the resin blend is used, additional primer coating on the protective film for a polarizing plate may be omitted, and an excellent adhesive strength to the polarizer may be exhibited, thereby reducing production time and cost and increasing productivity.

4 Claims, 2 Drawing Sheets

(51) Int. Cl.
  *G02B 1/14* (2015.01)
  *B32B 27/30* (2006.01)
  *C08F 212/14* (2006.01)
(52) U.S. Cl.
  CPC .............. *C08F 212/14* (2013.01); *G02B 1/14* (2015.01); *B32B 2250/03* (2013.01); *B32B 2250/24* (2013.01); *B32B 2551/00* (2013.01)

(56) References Cited

U.S. PATENT DOCUMENTS

| | | | | |
|---|---|---|---|---|
| 4,607,080 | A | * | 8/1986 | Yusa ........................ C08L 25/14 525/80 |
| 5,824,741 | A | * | 10/1998 | Kohler .................... C08L 25/12 525/73 |
| 7,067,188 | B1 | * | 6/2006 | Yang ................... B29C 47/0004 428/327 |
| 2006/0219133 | A1 | * | 10/2006 | Sakamoto .............. B82Y 30/00 106/31.65 |
| 2007/0282077 | A1 | * | 12/2007 | Miyamoto .............. C08L 25/14 525/418 |
| 2011/0147965 | A1 | * | 6/2011 | Mistry ..................... A61K 8/11 264/7 |
| 2011/0297896 | A1 | * | 12/2011 | Kim ..................... C08F 220/18 252/585 |
| 2013/0163082 | A1 | * | 6/2013 | Tamada ............... G02B 5/3083 359/489.07 |
| 2013/0330558 | A1 | * | 12/2013 | Yoo ....................... C08L 101/02 428/407 |

FOREIGN PATENT DOCUMENTS

| | | |
|---|---|---|
| CN | 103154127 A | 6/2013 |
| CN | 105531315 A | 4/2016 |
| JP | 2008-050536 | 3/2008 |
| KR | 1020100081932 | 7/2010 |
| KR | 1020100094425 | 8/2010 |
| KR | 1020110131124 | 12/2011 |
| KR | 1020120009864 | 2/2012 |
| KR | 1020120038909 | 4/2012 |
| KR | 1020120038912 | 4/2012 |
| KR | 1020120040964 | 4/2012 |
| WO | WO 2012/050400 * | 4/2012 |

* cited by examiner

[FIG. 1]
Example 4
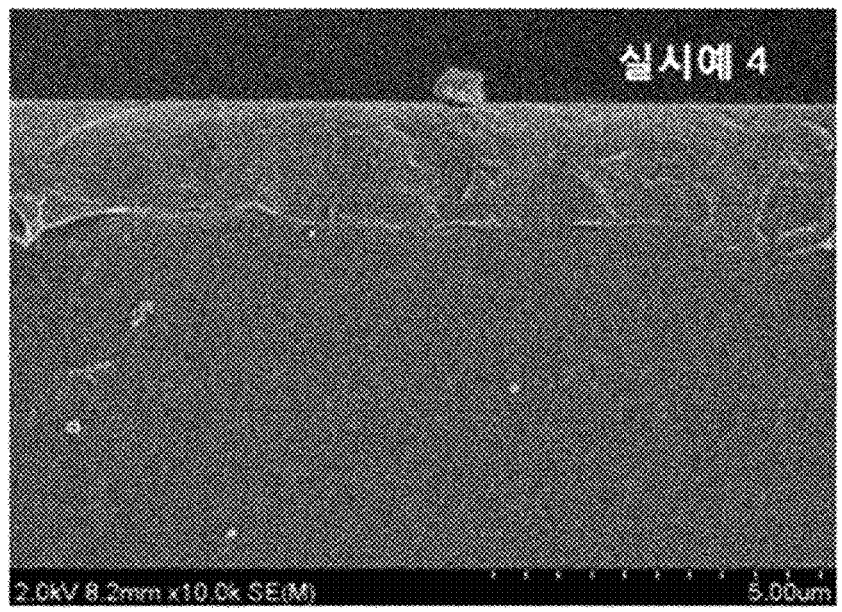
[FIG. 2]
Comparative Example 1
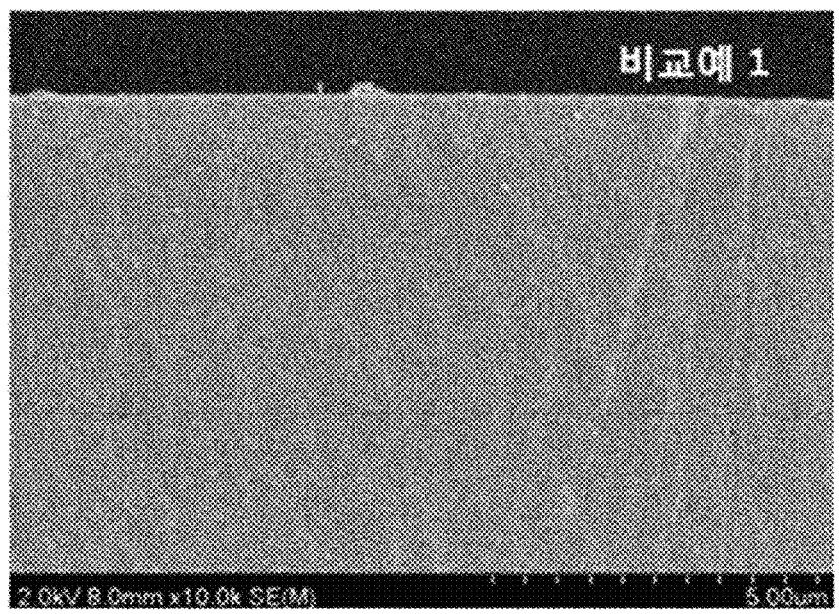

[FIG. 3]
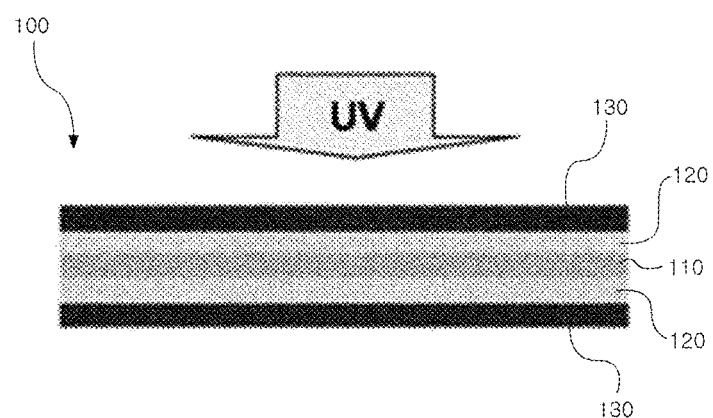

RESIN BLEND

CROSS-REFERENCE

This application is a National Stage Application of International Application No. PCT/KR2014/006361, filed Jul. 15, 2014, and claims priority to and the benefit of Korean Patent Application No. 10-2013-0082947, filed on Jul. 15, 2013 and Korean Patent Application No. 10-2014-0088874, filed Jul. 15, 2014, the contents of which are incorporated by reference in their entirety for all purposes as if fully set forth below.

TECHNICAL FIELD

The present application relates to a resin blend, a pellet, a method of manufacturing a resin molded article using the same, and a resin molded article.

BACKGROUND ART

A polarizing plate is an optical functional film applied to a device such as a liquid crystal display (LCD).

The polarizing plate may include a polarizer, which is a functional sheet capable of extracting only light oscillating in one direction from incident light oscillating in various directions, and a triacetyl cellulose (TAC)-based protective film conventionally adhered by an adhesive or pressure-sensitive adhesive to both surfaces of the polarizer.

However, a general TAC-based protective film is expensive, and not easily manufactured, and therefore, as a protective film to replace the TAC-based protective film, an acrylic protective film is used. In addition, since the TAC-based protective film has water absorbance, an aqueous adhesive such as a polyvinylalcohol adhesive can be used, but the acrylic protective film generally has low absorbance, and thus is adhered to the polarizer using a UV-curable adhesive instead of the aqueous adhesive. However, in this case, the acrylic protective film does not have an excellent adhesive strength to the polarizer, and the above-described problem is solved by coating a primer to one or both surfaces of the acrylic protective film.

DISCLOSURE

Technical Problem

The present application is directed to providing a resin blend and a pellet.

Technical Solution

One aspect of the present application provides a resin blend, which includes a first resin; and a second resin having a difference in surface energy or melt viscosity from the first resin. The second resin is a monomer blend including 70 to 95 parts by weight of an alkyl(meth)acrylate having an alkyl group having 1 to 14 carbon atoms; and 5 to 30 parts by weight of a monomer of Formula 1.

[Formula 1]

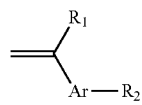

In this formula, $R_1$ is hydrogen or an alkyl group having 1 to 4 carbon atoms, Ar is phenyl, and $R_2$ is hydrogen or —X—$R_6$ in which —X— is —O— or —OC(O), and $R_6$ is an alkyl group having 1 to 4 carbon atoms.

Another aspect of the present application provides a pellet, which includes a core formed of a first resin; and a shell formed of a second resin having a difference in surface energy or melt viscosity from the first resin.

Still another aspect of the present application provides a method of manufacturing a resin molded article, which includes forming a melt blend by melting the resin blend; and forming a layer-separated structure by processing the melt blend.

Yet another aspect of the present application provides a method of manufacturing a resin molded article, which includes forming a melt blend by melting the pellet; and forming a layer-separated structure by processing the melt blend.

Yet another aspect of the present application provides a resin molded article, which includes a first resin layer; a second resin layer formed on the first resin layer; and an interface layer including a first resin and a second resin, and formed between the first resin layer and the second resin layer. The second resin is a polymer of a monomer blend including 70 to 95 parts by weight of an alkyl(meth)acrylate having an alkyl group having 1 to 14 carbon atoms; and 5 to 30 parts by weight of a monomer of Formula 1.

[Formula 1]

In this formula, $R_1$ is hydrogen or an alkyl group having 1 to 4 carbon atoms, Ar is phenyl, and $R_2$ is hydrogen or —X—$R_6$ in which —X— is —O— or —OC(O), and $R_6$ is an alkyl group having 1 to 4 carbon atoms.

Hereinafter, a resin blend, a copolymer, a pellet, a method of manufacturing a resin molded article using the same, and a resin molded article according to exemplary embodiments will be described in detail.

Here, the term "blend" may be a blend of at least two different resins. A type of the blend is not particularly limited, and the blend may be prepared by mixing at least two resins or at least two pellets in one matrix. The resins may have different physical properties, which may be, for example, a surface energy, melt viscosity or solubility parameter.

The term "melting processing" refers to a process of melting a resin blend at a melting temperature (Tm) or more to form a melt blend, and forming a desired molded article using the melt blend, and may be, for example, injection molding, extrusion molding, hollow molding, transfer molding, film blowing, fiber spinning, calendering heat molding or foaming.

The term "resin molded article" refers to a pellet or product formed from a resin blend, and the resin molded article may be, but is not particularly limited to, for example, an automobile part, a part for an electronic device, a part for a machine, a toy or a pipe.

The term "layer separation" may refer to a layer formed by substantially one resin disposed or arranged on a layer formed of a substantially different resin. The layer formed of substantially one resin may refer to one type of a resin that does not have a sea-island structure, and is continuously present on the entire layer. The sea-island structure refers to a layer-separated resin that is partially distributed in an entire resin blend. In addition, the expression "substantially formed" may mean that only one resin is present or abundant in one layer.

In one example, the resin blend may be layer-separated by melt processing. Accordingly, a resin molded article having a specific surface function, for example, an excellent adhesive property, may be manufactured without separate processes such as coating and plating. Therefore, the resin molded article may have an enhanced adhesive property, and when the resin blend is used, the cost and time for producing the resin molded article may be reduced.

The layer separation of the resin blend may be performed by a difference in a physical property between the first resin and the second resin and/or a polydispersity index of the second resin. Here, the physical property may be, for example, a surface energy, melt viscosity or solubility parameter. In the specification, a resin blend including two types of resins will be described, but it is apparent to those of ordinary skill in the art that even when three types of resins having different physical properties are mixed, layer separation occurs by melt processing.

In one embodiment, the resin blend may include a first resin and a second resin having a difference in surface energy from the first resin of 0.1 to 35 mN/m.

The difference in surface energy between the first resin and the second resin may be 0.1 to 35, 0.1 to 30, 0.1 to 20, 0.1 to 15, 0.1 to 7, 1 to 35, 1 to 30, 2 to 20, or 3 to 15 mN/m at 25° C. When the first and second resins having a difference in surface energy in this range are used, the first and second resins are not delaminated, and the second resin may be easily transferred to a surface, thereby easily performing a layer separation phenomenon.

The resin blend of the first and second resins having a difference in surface energy of 0.1 to 35 mN/m at 25° C. may be layer-separated by melt processing. In one example, when the resin blend of the first and second resins is melt-processed, and exposed to the air, the first and second resins may be separated by a difference in hydrophobicity. Particularly, since the second resin having a surface energy lower than the first resin has high hydrophobicity, the second resin may be transferred to be in contact with an air, thereby forming a second resin layer disposed in the air. In addition, when the first resin is in contact with the second resin, it may be disposed on the other side of the air. Accordingly, layer separation occurs between the first resin and the second resin of the resin blend.

The resin blend may be separated into at least two layers. In one example, when surfaces of the melt-processed resin blend facing each other are exposed to the air, the resin blend including the first resin and the second resin may be layer-separated into three layers, for example, a second resin layer/a first resin layer/a second resin layer. Meanwhile, when only one surface of the melt-processed resin blend is exposed to the air, the resin blend may be layer-separated into two layers, for example, a second resin layer/a first resin layer. In addition, when the resin blend including a first resin, a second resin and a third resin, which have different levels of surface energy, is melted, the melt-processed resin blend may be layer-separated into five layers, for example, a third resin layer/a second resin layer/a first resin layer/a second resin layer/a third resin layer. In addition, when all surfaces of the melt-processed resin blend are exposed to the air, the resin blend may be layer-separated in every direction, thereby forming a core-shell structure.

In another embodiment, the resin blend may include a first resin; and a second resin having a difference in melt viscosity from the first resin at a shear rate of 100 to 1000 s$^{-1}$ and a processing temperature of the resin blend of 0.1 to 3000 pa*s.

The difference in melt viscosity between the first resin and the second resin may be 0.1 to 3000, 1 to 2000, 1 to 1000, 1 to 500, 50 to 500, 100 to 500, 200 to 500 or 250 to 500 pa*s at a shear rate of 100 to 1000 s$^{-1}$ and a processing temperature of the resin blend. When the first and second resins having a difference in melt viscosity in this range are used, the first and second resins are not delaminated, and the second resin may be easily transferred toward a surface, thereby easily performing a layer separation phenomenon.

The resin blend of the first resin and the second resin having a difference in melt viscosity of 0.1 to 3000 pa*s at a shear rate of 100 to 1000 s−1 and a processing temperature of the resin blend may be layer-separated due to the difference in melt viscosity after melting. In one example, when the resin blend of the first resin and the second resin is melt-processed and exposed to the air, the first resin and the second resin may be separated due to flowability difference. Particularly, since the second resin having a lower melt viscosity than the first resin has a high flowability, it may be transferred to be in contact with the air, thereby forming a second resin layer disposed in the air. In addition, the first resin may be in contact with the second resin and disposed on the opposite side of the air. Therefore, the layer separation occurs between the first resin and the second resin of the resin blend.

The melt viscosity may be measured by capillary flow, which refers to a shear viscosity (pa*s) according to specific processing temperature and shear rate (/s).

The term "shear rate" may refer to a shear rate applied when the resin blend is processed, and the shear rate may be controlled between 100 to 1000 s$^{-1}$ according to a processing method. The control of the shear rate according to the processing method is apparent to those of ordinary skill in the art.

The term "processing temperature" refers to a temperature for processing the resin blend. For example, when the resin blend is used in melt processing such as extrusion or injection, the processing temperature refers to a temperature applied to the melt processing. The processing temperature may be controlled according to a resin applied to the melting process such as extrusion or injection. For example, in the case of the resin blend including the first resin of an acrylonitrile butadiene styrene (ABS) resin and the second resin obtained from an acrylic monomer, the processing temperature may be 210 to 270° C.

In still another aspect of the present application, a resin blend for forming a layer-separated structure includes a first resin; and a second resin having a difference in a solubility parameter from the first resin of 0.001 to 10.0 (J/cm$^3$)$^{1/2}$ at 25° C.

The difference in the solubility parameter between the first resin and the second resin may be 0.001 to 10.0, 0.01 to 5.0, 0.01 to 3.0, 0.01 to 2.0, 0.1 to 1.0, 0.1 to 10.0, 3.0 to 10.0, 5.0 to 10.0 or 3.0 to 8.0 (J/cm$^3$)$^{1/2}$ at 25° C. Such a solubility parameter is a unique characteristic of a resin exhibiting solubility according to polarity of each resin molecule, and the solubility parameter for each resin is generally known. When the difference in the solubility parameter is smaller than 0.001 (J/cm$^3$)$^{1/2}$, the first resin and the second resin are easily blended, and thus it is difficult to easily perform the layer separation phenomenon, and when the difference in the solubility parameter is larger than 10.0

$(J/cm^3)^{1/2}$, the first resin and the second resin may not be bound to each other and delaminated.

The upper limit and/or lower limit of the difference in the solubility parameter may be an optional value in a range of 0.001 to 10.0 $(J/cm^3)^{1/2}$, and may be dependent on a physical property of the first resin. Particularly, when the first resin is used as a base resin, and the second resin is used as a functional resin to enhance a surface characteristic of the first resin, the second resin may be selected to have a difference in the solubility parameter between the first resin and the second resin of 0.001 to 10.0 $(J/cm^3)^{1/2}$ at 25° C. In one example, the difference in the solubility parameter may be selected in consideration of miscibility of the second resin in the melt blend of the first resin and the second resin.

The resin blend of the first resin and the second resin having the difference in the solubility parameter of 0.001 to 10.0 $(J/cm^3)^{1/2}$ at 25° C. may be layer-separated due to the difference in the solubility parameter after melt processing. In one example, when the resin blend of the first resin and the second resin is melt-processed and exposed to the air, the first resin and the second resin may be separated due to a degree of miscibility. Particularly, the second resin having the difference in the solubility parameter of 0.001 to 10 $(J/cm^3)^{1/2}$ at 25° C. from the first resin may not be blended with the first resin. However, when the second resin further has a lower surface tension or melt viscosity than the first resin, the second resin may be transferred to be in contact with the air, thereby forming a second resin layer disposed in the air. In addition, the first resin may be in contact with the second resin and disposed on the opposite side of the air. Accordingly, the layer separation between the first resin and the second resin of the resin blend occurs.

In the resin blend, as the first resin, a resin usually determining a physical property of a desired molded article may be selected according to a type of the desired molded article and a used process condition. As such a first resin, a general synthetic resin may be used without particular limitation.

The first resin may be, for example, a styrene-based resin such as an ABS-based resin, an polystyrene-based resin, an acrylonitrile styrene acrylate (ASA)-based resin or a styrene-butadiene-styrene block copolymer; a polyolefin-based resin such as a high density polyethylene-based resin, a low density polyethylene-based resin or a polypropylene-based resin; a thermoplastic elastomer such as an ester-based thermoplastic elastomer or an olefin-based thermoplastic elastomer; a polyoxyalkylene-based resin such as a polyoxymethylene-based resin or a polyoxyethylene-based resin; a polyester-based resin such as a polyethylene terephthalate-based resin or a polybutylene terephthalate-based resin; a polyvinyl chloride-based resin; a polycarbonate-based resin; a polyphenylenesulfide-based resin; a vinylalcohol-based resin; a polyamide-based resin; an acrylate-based resin; an engineering plastic; a copolymer thereof or a blend thereof. The engineering plastic may be a plastic exhibiting excellent mechanical and thermal properties. For example, polyetherketone, polysulfone and polyimide may be used as the engineering plastic. In one example, as the first resin, a copolymer obtained by polymerizing acrylonitrile, butadiene, styrene and an acryl monomer may be used.

In one example, the first resin may be a polymer of a monomer blend including an alkyl(meth)acrylate having an alkyl group having 1 to 14 carbon atoms; a monomer of Formula 1; and a monomer of Formula 2.

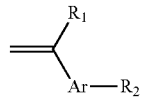

[Formula 1]

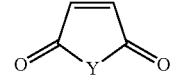

[Formula 2]

In Formulas 1 and 2, $R_1$ is independently hydrogen or an alkyl group having 1 to 4 carbon atoms, Ar is phenyl, $R_2$ is hydrogen or —X—$R_6$, in which —X— is —O— or —OC(O), and $R_6$ is an alkyl group having 1 to 4 carbon atoms, Y is oxygen or $NR_{10}$, and $R_{10}$ is hydrogen, an alkyl group having 1 to 12 carbon atoms or a cycloalkyl group having 3 to 8 carbon atoms.

In one example, the monomer of Formula 1 may be styrene or α-methyl styrene, and the monomer of Formula 2 may be cyclohexyl maleimide or maleic acid anhydride, but the present application is not limited thereto.

In addition, the monomer blend forming the polymer of first resin may include 85 to 98 parts by weight of an alkyl(meth)acrylate having an alkyl group having 1 to 14 carbon atoms; 1 to 5 parts by weight of the monomer of Formula 1; and 3 to 10 parts by weight of the monomer of Formula 2. When the alkyl(meth)acrylate having an alkyl group having 1 to 14 carbon atoms is included at less than 85 parts by weight, compatibility with the second resin, which will be described below, may be excessively degraded, resulting in delamination occurring on surfaces of the first resin and the second resin.

In the resin blend, as the second resin, a resin exhibiting a difference in a physical property from the first resin as described above and providing suitable compatibility with the first resin and excellent affinity with an adhesive may be used.

In one example, the second resin may be a polymer of a monomer blend including 70 to 95 parts by weight of an alkyl(meth)acrylate having an alkyl group having 1 to 14 carbon atoms; and 5 to 30 parts by weight of the monomer of Formula 1.

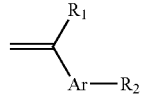

[Formula 1]

In Formula 1, $R_1$ is independently hydrogen or an alkyl group having 1 to 4 carbon atoms, Ar is phenyl, $R_2$ is hydrogen or —X—$R_6$, in which —X— is —O— or —OC(O), and $R_6$ is an alkyl group having 1 to 4 carbon atoms.

In addition, in Formula 1, for example, $R_1$ may be hydrogen or a methyl group, Ar may be phenyl, and $R_2$ may be hydrogen or —X—$R_6$, in which —X— is —O— or —OC(O)—, and $R_6$ is a methyl group or an ethyl group.

The first resin and the second resin are layer-separation inducing factors, and when the compatibility between the first and second resins is too high, layer separation efficiency between the first and second resins is reduced, and when the compatibility is not high, surface delamination may occur or a large domain may be formed in the molded article. Accordingly, for effective layer separation, suitable compatibility between the first and second resins is required.

Accordingly, in the second resin of the present application, a specific monomer may be included in a suitable content in consideration of the compatibility with the first resin to achieve the object of the present application.

In one example, the monomer blend of the second resin may include 70 to 95 parts by weight, for example, 70 to 90, or 75 to 90 parts by weight of an alkyl(meth)acrylate having an alkyl group having 1 to 14 carbon atoms to exhibit excellent compatibility with the first resin. For example, the alkyl(meth)acrylate monomer having an alkyl group having 1 to 14 carbon atoms is a component included in the monomer blend of the first resin to ensure compatibility between the first resin and the second resin.

The monomer of Formula 1 is a component allowing effective layer separation, which is included in the monomer blend of the second resin. The monomer of Formula 1 is, for example, a component having a low compatibility with the monomer of Formula 2 included in the monomer blend of the first resin, which may be included in the monomer blend of the second resin. The monomer of Formula 1 may be included in the monomer blend of the second resin at 5 to 30, 10 to 30 or 10 to 25 parts by weight. When the monomer of Formula 1 is included at more than 30 parts by weight, the compatibility with the first resin is excessively degraded, and thus a delamination phenomenon may occur at surfaces of the first and second resins.

In one example, the monomer of Formula 1 may be a styrene unsubstituted or substituted by at least one selected from the group consisting of methyl, methoxy, ethoxy and acetoxy, and for example, in terms of an excellent adhesive property to a polarizer, the monomer may be acetoxystyrene, methoxystyrene or methyl 4-vinylbenzoate, but the present application is not limited thereto. The monomer of Formula 1 may be included the second resin, thereby ensuring an excellent adhesive strength to the polarizer.

When the resin molded article formed of the resin blend is used as a protective film for a polarizing plate, a TAC-based film or a conventionally used acrylic protective film may be replaced. Particularly, in the conventional acrylic protective film, a surface should be coated with a primer through a separate coating process to ensure an adhesive property to the polarizer, but when the resin blend according to the present application and the protective film manufactured thereof are used, additional primer coating performed on a surface of the protective film for a polarizing plate may be omitted, and an excellent adhesive strength to the polarizer may be exhibited, thereby reducing production time and cost and increasing productivity.

In one example, the second resin may have a weight average molecular weight (Mw) of approximately 5,000 to 200,000. In addition, in another example, the weight average molecular weight of the second resin may be controlled to approximately 10,000 to 200,000, 15,000 to 200,000, 20,000 to 200,000, 5,000 to 180,000, 5,000 to 150,000, 5,000 to 120,000, 10,000 to 180,000, 15,000 to 150,000, or 20,000 to 120,000. When the second resin having the weight average molecular weight in such a range is applied to, for example, a resin blend for melting processing, layer separation may be easily performed due to suitable flowability of the second resin.

In addition, in one example, a polydispersity index (PDI) of the second resin may be controlled within a range of 1 to 2.5, 1 to 2.2, 1.5 to 2.5 or 1.5 to 2.2. When the second resin having PDI in such a range is applied to, for example, the resin blend for melt processing, a content of a low molecular weight structure and/or a high molecular weight structure in the second resin for inhibiting the layer separation may be reduced, and thus the layer separation may be more easily performed.

In one example, the resin blend may include 0.1 to 50 parts by weight of the second resin with respect to 100 parts by weight of the first resin. Alternatively, in another example, the resin blend may include 1 to 30, 1 to 20 or 1 to 15 parts by weight of the second resin with respect to 100 parts by weight of the first resin. When the first resin and the second resin are included at the above contents, the layer separation phenomenon may be induced, and an economical resin blend may be provided by suitably controlling a content of the second resin which is relatively more expensive than the first resin.

The above-described resin blend may be manufactured in a pellet by extrusion. In the pellet manufactured using the resin blend, a core may be formed of the first resin, and a shell may be formed of the second resin which is layer-separated from the first resin.

Yet another aspect of the present application provides a pellet, which includes a core formed of a first resin, and a shell formed of a second resin which is a polymer of a monomer blend having a difference in a surface energy, melt viscosity or solubility parameter from the first resin, and including 70 to 95 parts by weight of an alkyl(meth)acrylate having an alkyl group of 1 to 14 carbon atoms and 5 to 30 parts by weight of the monomer of Formula 1.

In addition, as described above, the first and second resins may have a different surface energy, melt viscosity or solubility parameter. For example, the first and second resins may have a difference in surface energy of 0.1 to 35 mN/m at 25° C., or a difference in melt viscosity of 0.1 to 3000 pa*s at a shear rate of 100 to 1000 $s^{-1}$ and a processing temperature of the pellet.

Details of types and physical properties of the first resin and the second resin have been already described, and thus will not be repeated below.

Meanwhile, a resin molded article having a layer-separated structure by melt-processing the resin blend or pellet may be provided.

Yet another aspect of the present application provides a method of manufacturing a resin molded article, which includes forming a melt blend by melting a resin blend, and forming a layer-separated structure by processing the melt blend.

As described above, because of the difference in physical properties between the first and second resins, a layer separation phenomenon may occur during the melt processing of the resin blend, and the layer separation phenomenon may provide an effect of selectively coating a surface of the pellet or molded article without a separate additional process.

Particularly, when a polymer of a monomer blend including 70 to 95 parts by weight of an alkyl(meth)acrylate having an alkyl group having 1 to 14 carbon atoms, and 5 to 30 parts by weight of the monomer of Formula 1 is used as the second resin, a resin molded article having an enhanced mechanical and surface characteristics by disposing a shell part having a relatively low surface energy or melt viscosity on a surface of the resin molded article in the melt processing may be provided.

The melting process of the resin blend may be performed under a shear stress. For example, the melt processing may be performed by extrusion and/or injection.

In addition, in the melt processing of the resin blend, an applied temperature may vary according to the types of the first and second resins. For example, when a styrene-based resin is used as the first resin and an acrylic resin is used as the second resin, a melting temperature may be controlled within a range of approximately 210 to 270° C.

The method of manufacturing a resin molded article may further include curing a result obtained by melt-processing the resin blend, that is, a melt product of the resin blend. The curing may be, for example, thermal curing or UV curing. In addition, chemical or physical treatment may be further performed on the resin molded article.

In one example, the method of manufacturing a resin molded article may further include preparing a second resin before forming a melt blend by melting the resin blend. The second resin may provide a specific function, for example, an excellent adhesive property, to a surface layer of the resin molded article. Details relating to the preparation of the second resin have been described, and therefore will not be repeated below.

According to another embodiment, the method of manufacturing a resin molded article may include forming a melt blend by melting a pellet, and forming a layer-separated structure by processing the melt blend.

In one example, the pellet may be manufactured by melt processing, for example, extrusion. For example, when the resin blend including the first and second resins is extruded, the second resin having a higher hydrophobicity than the first resin may be transferred to be in contact with the air, thereby forming a shell of the pellet, and the first resin may be disposed in the center of the pellet, thereby forming a core. The pellet manufactured as described above may be manufactured using a resin molded article by melt processing such as injection. However, the method of manufacturing the pellet is not limited thereto, and in another example, a resin molded article may be directly formed using the resin blend by melt processing, for example, injection.

Meanwhile, yet another aspect of the present application provides a resin molded article, which includes a first resin layer, a second resin layer formed on the first resin layer, and an interface layer formed between the first resin layer and the second resin layer. The interface layer may include first and second resins.

The resin molded article manufactured from a resin blend including a specific first resin and a second resin having a difference in a physical property from the first resin may have, for example, a layer-separated structure. Here, the first resin layer may be disposed in the structure, and the second resin layer is formed on a surface of the resin molded article.

Particularly, when the above-described resin is used as the second resin, an adhesive strength of the molded article may be additionally enhanced.

The term "first resin layer" may mainly include the first resin, determine a physical property of the molded article, and be disposed in the inner portion of the resin molded article. In addition, the "second resin layer" may mainly include the second resin, be disposed outside portion of the resin molded article, and provide a certain function to a surface of the molded article.

Details of the first and second resins have been described, and therefore will not be repeated below.

The resin molded article may include an interface layer between the first resin layer and the second resin layer, and include a blend of the first and second resins. The interface layer may be formed between the layer-separated first and second resin layers to serve as a boundary surface, and include the blend of the first and second resins. The blend may be in a state in which the first resin and the second resin are physically or chemically bound to each other, and thereby the first resin layer may be bound to the second resin layer.

The resin molded article may be formed in a structure in which the first resin layer is separated from the second resin layer by such an interface layer, and the second resin layer may be disposed outside the resin molded article. For example, the molded article may have a structure in which the first resin layer, the interface layer and the second resin layer are sequentially stacked, or the interface layer and the second resin layer are disposed on and under the first resin layer, respectively. Alternatively, the resin molded article may have a structure in which the first resin layer having various stereoscopic shapes, for example, a spherical. circular, polygonal, and sheet shape is sequentially covered with the interface layer and the second resin layer.

It is seen that the layer separation phenomenon shown in the resin molded article is caused by manufacturing a resin molded article by applying specific first and second resins having different physical properties. An example of the different physical properties may be surface energy or melt viscosity. Details of the difference in physical properties have been described above.

In one example, the first resin layer, the interface layer and the second resin layer may be identified using an SEM by etching a broken surface of a sample using a THF vapor after a low temperature impact test. To measure a thickness of each layer, the sample was cut with a diamond knife using microtoming equipment to form a smooth cross-section, and the smooth cross-section is etched using a solution selectively melting the second resin, rather than the first resin. In the etched cross-section, a degree of melting is different according to the contents of the first and second resins, and when the cross-section is observed at 45 degrees from the surface thereof using an SEM, due to the difference of shades, the first resin layer, the second resin layer, the interface layer and the surface may be observed, and a thickness of each layer may be measured. In one example, as the solution selectively melting the second resin, a 1,2-dichloroethane solution (10 vol %, in EtOH) is used, but is merely an example. The solution may be any one having a higher solubility of the second resin than the first resin without particular limitation, and may be suitably selected by those of ordinary skill in the art according to the type and composition of the second resin.

The interface layer may have a thickness 1 to 95%, 10 to 95%, 20 to 95%, 30 to 95%, 40 to 95%, 50 to 95%, 60 to 95% or 60 to 90% of the total thickness of the second resin layer and the interface layer. When the interface layer has a thickness 0.01 to 95% of the total thickness of the second resin layer and the interface layer, an interface binding strength between the first resin layer and the second resin layer is excellent, and thus the delamination phenomenon between the layers does not occur, and a surface characteristic obtained by the second resin layer may be considerably enhanced. Contrarily, when the interface layer is too thin, compared to the second resin layer, the delamination between the first resin layer and the second resin layer may occur due to a low binding strength between the layers, and when the interface layer is too thick, enhancement of the surface characteristic obtained by the second resin layer may be significant.

The second resin layer may have a thickness 0.01 to 30%, 0.01 to 20%, 0.01 to 10%, 0.01 to 5%, 0.01 to 3%, 0.01 to 1% or 0.01 to 0.1% of the entire resin molded article. As the second resin layer has a thickness in a predetermined range, an enhanced adhesive property may be provided to a surface of the molded article. When the thickness of the second resin layer is too small, it may be difficult to sufficiently enhance the surface characteristic of the molded article, and when the thickness of the second resin layer is too large, the physical property of a functional resin may be reflected on the resin molded article, thereby changing the mechanical property of the first resin.

From a surface of the second resin layer of the resin molded article having the above-described structure, a component of the first resin layer may be detected by an IR spectroscope.

Here, the surface of the second resin layer refers to a surface exposed to the outside (for example, in the air), not the first resin layer.

Details of the first resin, the second resin, and the difference in a physical property between the first resin and the second resin have been described above, and therefore will not be repeated below. In addition, the "difference in a physical property between the first resin and the second resin" used herein may refer to the difference in a physical property between the first resin and the second resin, or the difference in a physical property between the first resin layer and the second resin layer.

In one example, the resin molded article may be used to provide a protective film for a polarizing plate. For example, the resin molded article may be used instead of the conventionally used TAC-based protective film, and the polarizing plate may be provided in a state in which the second resin layer of the resin molded article is adhered to one or both surfaces of the polarizer. The type of the polarizer may be, but is not particularly limited to, for example, a film manufactured by adding a polarizing component such as iodine or a dichroic dye to a film formed of a polyvinylalcol-based resin, and extending the resulting film. As the polyvinylalcohol-based resin, a hydrolysate of polyvinylalcohol, polyvinylformal, polyvinylacetal or an ethylene-vinyl citrate copolymer may be used. In this case, a degree of polymerization of the polyvinylalcohol-based resin may be 100 to 5,000, and preferably, 1,400 to 4,000. In addition, a thickness of the polarizer may be suitably selected according to a use of a liquid crystal display, and usually, 5 to 80 µm, but the present application is not limited thereto. A method of adhering the protective film for a polarizing plate manufactured of the resin molded article of the present application to the polarizer is not particularly limited, and for example, the second resin layer of the resin molded article may be adhered to the polarizer using a known adhesive means such as a polyvinylalcohol-based adhesive or a UV-curable adhesive, for example, a radical-polymerizable adhesive polymerized from a hydroxyl group-containing acrylate, an epoxy-based acrylate, a urethane-based acrylate, an oxetane-based acrylate, a polyester-based acrylate or a silicon-based acrylate or a cation-polymerizable adhesive derived from an oligomer such as an epoxy resin vinyl ester. When the resin molded article formed of the resin blend is used as the protective film for a polarizing plate, a TAC-based film or a conventionally used acrylic protective film may be replaced, and particularly, to ensure an adhesive property to the polarizer, in the case of the conventional acrylic protective film, a primer should be coated on a surface through a separate coating process. However, when using the resin blend according to the present application and the protective film manufactured thereof, the second resin layer including the second resin having an excellent affinity with the adhesive is formed by layer separation in the melt processing, and therefore, additional primer coating performed on the surface of the protective film for a polarizing plate may be omitted. In addition, an excellent adhesive strength to the polarizer may be obtained, thereby reducing the production time and cost, and increasing productivity.

Advantageous Effects

An exemplary resin blend of the present application can provides a protective film for a polarizing plate having an excellent adhesive strength to a polarizer. In addition, when the resin blend is used, additional primer coating performed on a surface of the protective film for a polarizing plate can be omitted, and an excellent adhesive strength to the polarizer can be obtained, thereby reducing production time and cost and increasing productivity.

DESCRIPTION OF DRAWINGS

FIG. 1 is an SEM image of a layer-separated cross-section of a resin molded article manufactured in Example 4;

FIG. 2 is an SEM image of a cross-section of a resin molded article manufactured in Comparative Example 1; and FIG. 3 is an exemplary polarizing plate of the present application.

MODE FOR INVENTION

Hereinafter, the present application will be described in detail with reference to Examples and Comparative Examples, but the range of the resin blend is not limited to the following Examples.

Preparation Example

Preparation of Second Resin

Preparation Example 1

1674 g of methylethylketone as a solvent, 810 g of methylmethacrylate (MMA) and 90 g of styrene as monomers, and 1.17 g of n-dodecyl mercaptane (n-DDM) as a chain transfer agent were put into a reactor, after 1.8 g of azobisisobutyronitrile (AIBN) as an initiator was input in a nitrogen atmosphere, the resulting blend was stirred at 400 rpm. After polymerization was performed at a reaction temperature of 70° C. for 18 hours, a resulting product was precipitated in n-hexane, washed and dehydrated three times or more, and dried in an oven at 80° C.

Preparation Example 2

A second resin was prepared by the same method as described in Preparation Example 1, except that 675 g of methylmethacrylate and 225 g of styrene were used as monomers.

Preparation Example 3

A second resin was prepared by the same method as described in Preparation Example 1, except that 675 g of methylmethacrylate and 225 g of acetoxystyrene were used as monomers.

Preparation Example 4

A second resin was prepared by the same method as described in Preparation Example 1, except that 675 g of methylmethacrylate, 180 g of styrene, and 45 g of acetoxystyrene were used as monomers.

Preparation Example 5

A second resin was prepared by the same method as described in Preparation Example 1, except that 675 g of methylmethacrylate and 225 g of methoxystyrene were used as monomers.

Preparation Example 6

A second resin was prepared by the same method as described in Preparation Example 1, except that 675 g of methylmethacrylate, 180 g of styrene, and 45 g of methoxystyrene were used as monomers.

Preparation Example 7

A second resin was prepared by the same method as described in Preparation Example 1, except that 900 g of methylmethacrylate was used as a monomer.

Preparation Example 8

A second resin was prepared by the same method as described in Preparation Example 1, except that 450 g of methylmethacrylate and 450 g of styrene were used as monomers.

Preparation Example 9

A second resin was prepared by the same method as described in Preparation Example 1, except that 450 g of methylmethacrylate and 450 g of acetoxystyrene were used as monomers.

Preparation Example 10

A second resin was prepared by the same method as described in Preparation Example 1, except that 450 g of methylmethacrylate and 450 g of methoxystyrene were used as monomers.

Example 1

A pellet was obtained by mixing 90 parts by weight of a first resin (a thermoplastic resin composed of 91 parts by weight of methylmethacrylate, 6 parts by weight of cyclohexylmaleimide and 3 parts by weight of α-methylstyrene) and 10 parts by weight of the second resin prepared in Preparation Example 1, and extruding the resulting blend using a twin screw extruder (Leistritz) at 250° C. In addition, the pellet was extruded into an extrusion film having a thickness of 180 to 210 μm at 250° C. using an extruder (Hankook EM Ltd) having a T-die gap of 1 t. The extrusion film was extended by biaxial extension in MD and TD directions at 135° C., thereby manufacturing an extension film having a thickness of approximately 50 μm.

The extension film including the second resin and a polarizer were laminated using an adhesive, thereby manufacturing a stack structure having a structure of the extension film including an extension film including a second resin/adhesive/PVA/adhesive/an extension film including a second resin as shown in FIG. 3. The stack structure was exposed to UV rays to cure the adhesive, thereby manufacturing a polarizing plate.

Example 2

A sample was manufactured by the same method as described in Example 1, except that 10 parts by weight of the second resin obtained in Preparation Example 2 was mixed with 90 parts by weight of the first resin which was the same as used in Example 1.

Example 3

A sample was manufactured by the same method as described in Example 1, except that 10 parts by weight of the second resin obtained in Preparation Example 3 was mixed with 90 parts by weight of the first resin which was the same as used in Example 1.

Example 4

A sample was manufactured by the same method as described in Example 1, except that 10 parts by weight of the second resin obtained in Preparation Example 4 was mixed with 90 parts by weight of the first resin which was the same as used in Example 1.

Example 5

A sample was manufactured by the same method as described in Example 1, except that 10 parts by weight of the second resin obtained in Preparation Example 5 was mixed with 90 parts by weight of the first resin which was the same as used in Example 1.

Example 6

A sample was manufactured by the same method as described in Example 1, except that 10 parts by weight of the second resin obtained in Preparation Example 6 was mixed with 90 parts by weight of the first resin which was the same as used in Example 1.

Comparative Example 1

An extrusion film was manufactured by drying 100 parts by weight of the pellet of the first resin used in Example 1 in an oven and extruding the pellet by the same method as described in Example 1. An extension film was manufactured by extending the extrusion film by the same method as described in Example 1.

Comparative Example 2

A sample was manufactured by the same method as described in Example 1, except that 10 parts by weight of the second resin obtained in Preparation Example 7 was mixed with 90 parts by weight of the first resin which was the same as used in Example 1.

Comparative Example 3

A sample was manufactured by the same method as described in Example 1, except that 10 parts by weight of the second resin obtained in Preparation Example 8 was mixed with 90 parts by weight of the first resin which was the same as used in Example 1.

Comparative Example 4

A sample was manufactured by the same method as described in Example 1, except that 10 parts by weight of the second resin obtained in Preparation Example 9 was mixed with 90 parts by weight of the first resin which was the same as used in Example 1.

Comparative Example 5

A sample was manufactured by the same method as described in Example 1, except that 10 parts by weight of the second resin obtained in Preparation Example 10 was mixed with 90 parts by weight of the first resin which was the same as used in Example 1.

Physical properties in Examples and Comparative Examples were evaluated by the following methods.

1. Measurement of Optical Characteristics (Haze and Transmittance)

Haze and a transmittance of an extension film were measured using a haze meter HM-150 (Murakami Color Research Laboratory).

2. Measurement of Melt Viscosity

A melt viscosity was measured using a capillary rheometer 1501 (Gottfert).

Specifically, a capillary die was attached to a barrel, and resins obtained in the examples or comparative examples were filled over three times. In addition, a shear viscosity (pa*s) according to a shear rate at a processing temperature of 250° C. was measured.

3. Measurement of Adhesive Strength

To evaluate an adhesive strength between a polarizer and a protective film in a polarizing plate, the polarizing plate having a width of 18 mm was prepared. Specifically, the polarizing plate was prepared by adhering the samples prepared in the examples or comparative examples as a protective film using a cation- and radical-polymerized adhesive to one surface of the polarizer manufactured by extending a polyvinylalcohol-based resin film, dying the extended film with iodine and treating the dyed film with a boric acid aqueous solution such that a second resin layer of the sample was disposed to face the polarizer. A peeling strength at 90° of the prepared polarizing plate was measured using a texture analyzer (MHK) at 300 mm/min measured, and as shown in FIG. 3, a peeling strength between the polarizer and the protective film was measured on a side to which UV rays were irradiated. The peeling strength was measured three times, and an average was listed.

4. Observation of Shape of Cross-Section

After a low temperature impact test for the samples of the examples or comparative examples, a broken surface was etched using THF vapor, and a layer-separated cross-section was observed using an SEM (Manufacturer: Hitachi, Model name: S-4800).

A shape of the observed cross-section was evaluated according to the following criteria.

○: the state in which complete layer separation phenomenon was observed

Δ: the state in which layer separation was not sufficiently performed x: the state in which layer separation was not performed 5. Measurement of Surface Energy Surface energy was measured using a drop shape analyzer (DAS 100, KRUSS) according to the Owens-Wendt-Rabel-Kaelble method.

Specifically, the resin obtained in the examples or comparative examples was dissolved at 15 wt % in a methyl ethyl ketone solvent, and bar-coated on an LCD glass. In addition, the coated LCD glass was pre-dried in an oven at 60° C. for 2 minutes, and dried in an oven at 90° C. for 1 minute.

After drying (or curing), 10 drops of deionized water and diiodomethane each were dropped on the coated surface to obtain an average of a contact angle, and the surface energy was obtained by substituting the value by the Owens-Wendt-Rabel-Kaelble method.

TABLE 1

|  | Difference in surface energy | Optical characteristic | | Adhesive strength | Phase separation | Difference in melt viscosity |
| --- | --- | --- | --- | --- | --- | --- |
|  | (mN/m) | Haze | T(%) | (N/cm$^2$) |  | (pa*s) |
| Example 1 | 3 | 0.2 | 93.8 | 2.2 | ○ | 900 |
| Example 2 | 5 | 0.2 | 93.7 | 2.5 | ○ | 1010 |
| Example 3 | 5 | 0.2 | 93.9 | 2.4 | ○ | 990 |
| Example 4 | 6 | 0.2 | 93.9 | 2.7 | ○ | 995 |
| Example 5 | 5 | 0.2 | 93.6 | 2.3 | ○ | 985 |
| Example 6 | 5 | 0.2 | 93.7 | 2.6 | ○ | 990 |
| Comparative Example 1 | — | 0.2 | 93.9 | 2 | x | — |
| Comparative Example 2 | 2 | 0.2 | 93.7 | 2.5 | x | 1140 |
| Comparative Example 3 | 9 | 0.2 | 93.8 | 2.2 | ○ | 930 |
| Comparative Example 4 | 3 | 0.2 | 93.8 | 2.1 | ○ | 920 |
| Comparative Example 5 | 3 | 0.2 | 93.7 | 2 | ○ | 915 |

The invention claimed is:

1. A resin blend, comprising:

a first resin; and a second resin of an acryl polymer having a difference in a surface energy, melt viscosity or solubility parameter from the first resin, wherein the first resin is a polymer of a first monomer blend consisting of 85 to 98 parts by weight of an alkyl(meth)acrylate having an alkyl group having 1 to 14 carbon atoms; 1 to 5 parts by weight of the monomer of Formula 1; and 3 to 10 parts by weight of the monomer of Formula 2, based on 100 parts by weight of the first monomer blend, wherein the second resin is a polymer of a second monomer blend consisting of 70 to 95 parts by weight of an alkyl(meth)acrylate having an alkyl group having 1 to 14 carbon atoms; and 5 to 30 parts by weight of the monomer of Formula 1, wherein the monomer of Formula 1 is a styrene substituted by at least one substituent, based on 100 parts by weight of the second monomer blend, wherein the second resin is hydrophobic compared to the first resin, wherein the second resin has a difference in melt viscosity form the first resin of 0.1 to 3000 pa*s at a shear rate of 100 to 1000 s$^{-1}$ and a processing temperature of the resin blend, wherein the second resin is included at 0.1 to 20 parts by weight with respect to 100 parts by weight of the first resin, wherein the second resin has a difference in surface energy of 0.1 to 35 mN/m at 25° C. from the first resin, wherein the second resin has a difference in melt viscosity of 0.1 to 3,000 Pa·s from the first resin at a shear rate of 100 to 1,000 s$^{-1}$ and a processing temperature of the resin blend, wherein the second resin has a difference in solubility parameter from the solubility parameter from the first resin of 0.001 to 10.0 (J/cm$^3$)$^{1/2}$ at 25° C., and wherein the second resin has a polydispersity index of 1 to 2.5 and a weight average molecular weight of 5,000 to 200,000:

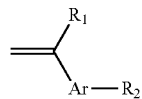

[Formula 1]

where $R_1$ is hydrogen or an alkyl group having 1 to 4 carbon atoms,

Ar is phenyl, and $R_2$ is hydrogen or —X—$R_6$ in which —X— is —O— or —OC(O), and $R_6$ is an alkyl group having 1 to 4 carbon atoms, wherein in the second resin the styrene substituted by at least one substituent is the monomer of Formula 1 in which $R_2$ is —X—$R_6$,

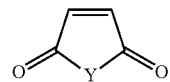

[Formula 2]

where Y is oxygen or $NR_{10}$, and $R_{10}$ is hydrogen, an alkyl group having 1 to 12 carbon atoms or a cycloalkyl group having 3 to 8 carbon atoms.

2. The resin blend according to claim 1, wherein, in the first resin, the monomer of Formula 1 is styrene or α-methyl styrene, and the monomer of Formula 2 is cyclohexyl maleimide or maleic acid anhydride.

3. The resin blend according to claim 1, wherein $R_1$ is hydrogen or an alkyl-group having 1 to 4 carbon atoms, Ar is phenyl, and $R_2$ is hydrogen or —X—$R_6$ in which —X— is —O— or —OC(O), and —$R_6$ is a methyl group or an ethyl group.

4. The resin blend according to claim 1, wherein, in the second resin, the monomer of Formula 1 is an unsubstituted styrene and a styrene substituted by at least one substituent selected from the group consisting of methyl, methoxy, ethoxy and acetoxy.

* * * * *